2,709,696

REACTION OF UNSULFONATED LIGNIN, FORMALDEHYDE AND SECONDARY AMINES AND PRODUCT

Emil Gabriel Wiest, Wilmington, Del., and Walter Jean Eaton, Carneys Point, N. J., assignors to E. I. du Pont de Nemours & Company, Wilmington, Del., a corporation of Delaware No Drawing. Application June 23, 1950,
Serial No. 170,042

6 Claims. (Cl. 260—124)

This invention relates to novel organic compounds. More particularly, this invention deals with novel, water-soluble derivatives of lignin, useful as tanning agents.

Hides and skins have been tanned with a variety of vegetable extracts such as quebracho, chestnut, hemlock, divi-divi, oak, spruce, sumac, etc. Some of these extracts are imported and at times become scarce and high priced. A number of efforts have been made to provide a domestic source of tanning materials both by growing suitable shrubs and trees from which tanning extracts may be obtained and by converting other raw materials into tanning agents. One of the cheapest and most plentiful raw materials considered is lignin. This is readily available as a by-product in paper manufacture and also in the utilization of farm products.

However, the application of lignin to the problem of tanning has not been developed to date to a commercially successful stage. Lignin itself is insoluble in water except under highly alkaline conditions. To be applicable as a tanning material, water-soluble derivative thereof must be employed. Hitherto, the only water-soluble forms of lignin available on a commercial scale have been the sulfonic acids thereof obtainable as by-products in the paper industry by the sulfite-pulp process. These, however, do not produce a tanning effect of sufficiently good quality to replace the aforementioned extracts. Furthermore, the vast supply of unsulfonated lignin, obtainable as by-product in the sulfate and soda-pulp processes of paper making and in the working-up of many agricultural residues such as corn cobs, flax shives, oat hulls, cotton-seed hulls and bagasse, have remained hitherto virtually untapped.

Now according to this invention water-soluble derivatives of lignin, of excellent tanning qualities are obtained by reacting lignin with formaldehyde and a primary or secondary amine.

The structure of lignin has not been determined definitely to date. Furthermore, its compositions often varies with the source employed and with other factors affecting its formation. The recent trend in science is to regard lignin as a polymer based upon a complicated fundamental unit of molecular weight of about 800–1000. This unit is often referred to as the lignin molecule, and will be so employed hereinbelow.

The lignin molecule has been determined to contain aromatic nuclei and furane or pyrane rings. It is also known to bear a relatively large number of methoxy groups and a smaller number of hydroxy groups, of alcoholic and phenolic natures. The presence of a methyl ketone group has also been postulated.

It is clear that the reaction which takes place according to our invention cannot very well be formulated by means of an accurate equation. However, it may be assumed that the reaction takes place with the active hydrogens adjacent to the phenolic and ketone groups. The resulting compounds forms salts with acids, such as HCl, and both in the form of such salts and in the form of free base it is soluble in water, acids and alkalis.

The synthesis may be effected in water or an organic solvent, such as dioxane, the lignin being preferably in the form of alkali-lignin, for instance the by-product of the sulfate-process or soda-pulp process of paper making. The quantities of formaldehyde and amine should preferably be not less than 1 mole each for each mole of lignin, the unit of M. W. 800–1000 being taken as 1 mole of lignin.

It will be understood that the above theoretical discussion in inserted merely for the sake of clarification, without however any intent to bind our invention to any particular theory, especially in view of the general obscurity of the nature of the principal factor, i. e., lignin. For the sake of further illustration, and without limiting our invention thereby, we give hereinbelow a few typical examples of our mode of procedure. Parts mentioned are by weight.

*Example 1.—Lignin-formaldehyde-dimethylamine reaction product*

42 parts by weight of alkali lignin were dissolved in 300 parts of dioxane by heating to a boil. The solution was cooled to 25° C. and a solution of 2.7 parts of dimethylamine in 100 parts of dioxane was added, followed by the addition of 4.1 parts of 37% aqueous formaldehyde over a period of 15 minutes at 25°–30° C. The reaction mass was allowed to stir at room temperature overnight and then heated for 6 hours at 60°–65° C. 1100 parts of water were then added to the reaction mass followed by 62 parts of concentrated hydrochloric acid (36%) to make the whole mixture acid to Congo red paper. The acidified mixture was heated at 60–65° C. for ½ hour and filtered hot from the unreacted material. To the clear filtrate 200 parts of sodium chloride were added whereupon the product precipitated out in a gummy form.

The gummy substance solidified after pressing free of water on a porous plate. After drying further, it was obtained as a reddish brown powder, which was soluble in water; it was also soluble in dilute alkaline solution but was insoluble in dioxane, acetone, cellosolve or alcohol. However, it was soluble in these solvents on addition of small amounts of water. The product contained nitrogen and chlorine, and a methoxyl content slightly lower than that of the initial lignin. Although a definite structure for this substance cannot be assigned at this time, it is believed to be the hydrochloride of a typical Mannich reaction product, i. e., a dimethyl amino methyl group attached to the lignin nucleus.

*Example 2.—Lignin-formaldehyde-dimethylamine-hydrochloride*

100 parts of finely powdered alkali lignin were suspended in 400 parts of water. To this suspension was added 12 parts of dimethylamine hydrochloride, 1 part of concentrated (36%) hydrochloric acid and 18 parts of 40% formaldehyde solution. The mixture was stirred and heated at 80°–85° C. under a reflux condenser for 4 hours. 500 parts of water and 20 parts of concentrated hydrochloric acid were then added and the mixture heated to boiling. The solution was filtered to remove a small amount of insoluble material. The filtrate was evaporated to dryness, taken up in a small volume of water and sodium hydroxide was added to bring the pH of the solution to 4–5. It was then ready to use as a tanning agent as shown below in Example 6.

*Example 3.—Lignin-formaldehyde-morpholine hydrochloride*

To 80 parts of alkali lignin in 300 parts of isoamyl alcohol were added 14 parts of morpholine hydrochloride and 6 parts of paraformaldehyde. The solution was then heated at 90°–100° C. under a reflux condenser for 1 hour. At the end of ½ hour an additional 2 parts of paraformaldehyde were added. The solvent alcohol was distilled off under vacuum and the residue was taken up in hot water and filtered to remove insoluble matter. The filtrate was then ready for use as a tanning agent.

*Example 4.—Lignin-formaldehyde-benzylamine hydrochloride*

60 parts of lignin were dissolved in 300 parts of dioxane with 26 parts of benzylamine hydrochloride and 15 parts of 40% formaldehyde solution. The mixture was stirred at 60°–70° C. under a reflux condenser for 4 hours. 3 parts of concentrated hydrochloric acid were added and stirring was continued for 30 minutes. The mass was then poured into water, the solution saturated with salt and the insoluble product was filtered off.

*Example 5.—Tanning*

A piece of pickled sheepskin, 3 x 3 inches was tumbled in 30 g. of water with 5 g. of sodium chloride for 30 minutes. To this was added a solution of 2.5 g. of the product of Example 1 in 23 g. of water, 23 g. of the monomethyl ether of diethylene glycol and 1 g. of 87% formic acid. The skin was tumbled in this solution for 6 hours, drained, rinsed, dried, wet back and staked. The resultant leather had a light tan color, good body strength, and a firm, rather than soft, feel. The shrink temperature was 56° C.

*Example 6.—Tanning*

A piece of pickled cowhide weighing 10 parts was tumbled with 15% salt solution for 30 minutes and drained. It was replaced in the tumbling jar and a tanning solution containing 10 parts of the solid of Example 1 and 90 parts of water which had been made acid to a pH of 4.5 with formic acid was added in four equal increments, tumbling 30 minutes after each addition. The skin was allowed to stand in the tanning solution overnight. It was drained, rinsed and fat liquored at 120° F. with 6% of its weight of sulfonated cod oil and then dried and staked. The resulting leather was firm, smooth grained and had a good full body.

It will be understood that the above procedures are susceptible of wide variation within the spirit of this invention. Thus, in lieu of dimethylamine other secondary amines may be used such as diethanolamine, dipropylamine, piperazine, etc. Instead of benzylamine other primary amines such as methylamine, ethylene diamine, allylamine, monoethanolamine, phenylethylamine, beta-naphthylamine, etc. may be used. In general, we prefer to use secondary amines, because then the possibility of cross linking reactions is minimized and the condensation products appear to be somewhat more soluble as the hydrochloride salts.

The temperature of the reaction may be anywhere from 50° to 100° C.

The duration of the reaction is best gaged by the degree of solubility of the product in water.

For evaluating the quality of the leather produced, in addition to the general appearance and feel, we have employed hereinabove the shrink-temperature method. It is a measure of the degree of tanning, depending on resistance to the action of hot water. It is determined by placing the leather in cold water which is heated gradually. The shrink temperature is the temperature at which the leather suddenly begins to shrink. A value over 50° C. is considered to indicate that a significant amount of tannage has been produced.

The lignin employed in the above examples was of the type called "alkali lignin," obtained from the black liquor arising in the soda-pulping of hard or soft woods. It is a brown powder; insoluble in water, but soluble in strong alkali. However, it is not necessary to start with alkali lignin. For instance, partially demethoxylated lignin may be used. On the other hand, partially oxidized, or so-called degraded lignin, as disclosed in U. S. P. 2,482,594, may also be used.

The products of this invention have the advantage over the natural vegetable extracts in that they are prepared from readily available materials and are not dependent on imports at varying price levels. Being manufactured chemicals they are also susceptible to close control of quality and need not vary in tanning strength from batch to batch as natural materials do. They may be used to tan various type leathers such as soft garment leathers, side leather for shoe uppers or sole leather, belting leather, etc. The lignin derivatives may be used as a retan after conventional chrome tanning or after tanning with other synthetic tanning agents such as aliphatic sulfonyl chlorides. They may also be used in admixture with the normal vegetable extracts commonly used as tanning agents.

We claim as our invention:

1. Water-soluble derivatives of lignin, being the compounds obtained by reacting, at a temperature between 50° and 100° C., 1 mole of lignin with 1 to 3 moles of formaldehyde and 1 to 3 moles of a secondary amine selected from the group consisting of the lower aliphatic secondary amines, morpholine and piperazine, said compounds being soluble in water and forming a water-soluble salt with hydrochloric acid.

2. Water-soluble derivatives of lignin, being the compounds obtained by reacting lignin, at a temperature between 50° and 100° C., with formaldehyde and dimethylamine, said compounds being soluble in water and forming a water-soluble salt with hydrochloric acid.

3. The process of producing a water-soluble derivative of lignin, having tanning powers, which comprises reacting 1 to 3 moles of formaldehyde and 1 to 3 moles of a secondary amine with 1 mole of lignin (the latter being considered as having a molecular weight of between 800 and 1000), the reaction being effected in a liquid medium selected from the group consisting of water and inert organic solvents, and at a temperature between 50° and 100° C., and the secondary amine being a member of the group consisting of the lower aliphatic secondary amines, morpholine and piperazine.

4. A process as in claim 3, the reaction being carried out in dioxane.

5. A process as in claim 3, the reaction being carried out in an aqueous medium.

6. Water-soluble derivatives of lignin, being the compounds obtained by reacting lignin, at a temperature between 50° and 100° C., with formaldehyde and morpholine, said compounds being soluble in water and forming a water-soluble salt with hydrochloric acid.

References Cited in the file of this patent

UNITED STATES PATENTS

| Number | Name | Date |
|---|---|---|
| 2,159,411 | Wallace | May 23, 1939 |
| 2,201,797 | Scott | May 21, 1940 |
| 2,205,355 | Grimm et al. | June 18, 1940 |
| 2,365,599 | Schirm | Dec. 19, 1944 |
| 2,488,186 | Grangaard | Nov. 15, 1949 |
| 2,562,898 | Evans et al. | Aug. 7, 1951 |